US010516969B2

(12) United States Patent
Heaven et al.

(10) Patent No.: US 10,516,969 B2
(45) Date of Patent: Dec. 24, 2019

(54) MOBILE APPLICATION FOR AN AMUSEMENT PARK OR WATERPARK

(71) Applicant: Whitewater West Industries Ltd., Richmond (CA)

(72) Inventors: Edwin Michael Gyde Heaven, North Vancouver (CA); Denise Weston, Wakefield, RI (US); Rick Briggs, Springfield, IL (US)

(73) Assignee: Whitewater West Industries Ltd., Richmond, BC (CA)

( * ) Notice: Subject to any disclaimer, the term of this patent is extended or adjusted under 35 U.S.C. 154(b) by 0 days.

(21) Appl. No.: 14/077,009

(22) Filed: Nov. 11, 2013

(65) Prior Publication Data

US 2014/0132400 A1    May 15, 2014

Related U.S. Application Data

(60) Provisional application No. 61/724,853, filed on Nov. 9, 2012.

(51) Int. Cl.
*H04W 4/024* (2018.01)
*H04W 4/029* (2018.01)
*H04W 4/021* (2018.01)
*A63G 31/00* (2006.01)
*H04W 4/50* (2018.01)

(52) U.S. Cl.
CPC ............ *H04W 4/024* (2018.02); *A63G 31/00* (2013.01); *H04W 4/021* (2013.01); *H04W 4/029* (2018.02); *H04W 4/50* (2018.02); *Y10T 137/0324* (2015.04)

(58) Field of Classification Search
CPC ....... H04W 4/001; H04W 4/021; H04W 4/02; H04W 4/043; H04W 4/04; H04W 4/023; H04W 4/025; A63G 31/00; G08C 17/02
USPC .......................... 340/12.5; 455/456.3; 705/5
See application file for complete search history.

(56) References Cited

U.S. PATENT DOCUMENTS

| 6,007,338 A * | 12/1999 | DiNunzio | G09B 9/02 |
| | | | 345/672 |
| 6,529,786 B1 * | 3/2003 | Sim | G06Q 10/02 |
| | | | 700/90 |
| 6,889,098 B1 | 5/2005 | Laval et al. | |
| 8,082,165 B2 | 12/2011 | Natsuyama et al. | |
| 8,775,244 B2 | 7/2014 | Boss et al. | |

(Continued)

*Primary Examiner* — Steven Lim
*Assistant Examiner* — Mancil Littlejohn, Jr.

(57) ABSTRACT

A mobile application for execution upon an electronic device for an amusement park or waterpark. The mobile application provides information, entertainment or other convenience data to the user while the user is within the park. The mobile application may be configured to determine a position of the electronic device within the park and display notifications including discounts at nearby vendors or restaurants, menus of nearby eateries, or ride recommendations based upon wait times. The mobile application may allow the user to make reservations at nearby restaurants within the park. The mobile application may generate an efficient ride sequence for the user based upon characteristics of either the user or the user's participation within the park and navigate the user around the park according to the ride sequence. Puzzles, games, or other entertainment or educational activities may be displayed to the user for providing rewards based upon their participation.

60 Claims, 5 Drawing Sheets

(56) References Cited

U.S. PATENT DOCUMENTS

| | | | |
|---|---|---|---|
| 2002/0116266 A1 | 8/2002 | Marshall | |
| 2003/0195808 A1* | 10/2003 | Brown | G06Q 30/0261 |
| | | | 705/14.58 |
| 2007/0207857 A1 | 9/2007 | Angell et al. | |
| 2007/0225911 A1* | 9/2007 | Chanick | G01C 21/20 |
| | | | 701/469 |
| 2008/0267107 A1* | 10/2008 | Rosenberg | H04H 20/61 |
| | | | 370/312 |
| 2009/0048878 A1 | 2/2009 | Metcalf et al. | |
| 2009/0104920 A1* | 4/2009 | Moon et al. | 455/456.3 |
| 2009/0210145 A1* | 8/2009 | Amano | G01C 21/36 |
| | | | 701/533 |
| 2009/0291672 A1 | 11/2009 | Treves et al. | |
| 2010/0063854 A1* | 3/2010 | Purvis | G06Q 10/02 |
| | | | 705/5 |
| 2010/0277276 A1* | 11/2010 | Bayne | G07C 9/00111 |
| | | | 340/5.21 |
| 2013/0024203 A1* | 1/2013 | Flores | G06Q 30/02 |
| | | | 705/1.1 |
| 2013/0332509 A1 | 12/2013 | Schwartz et al. | |

\* cited by examiner

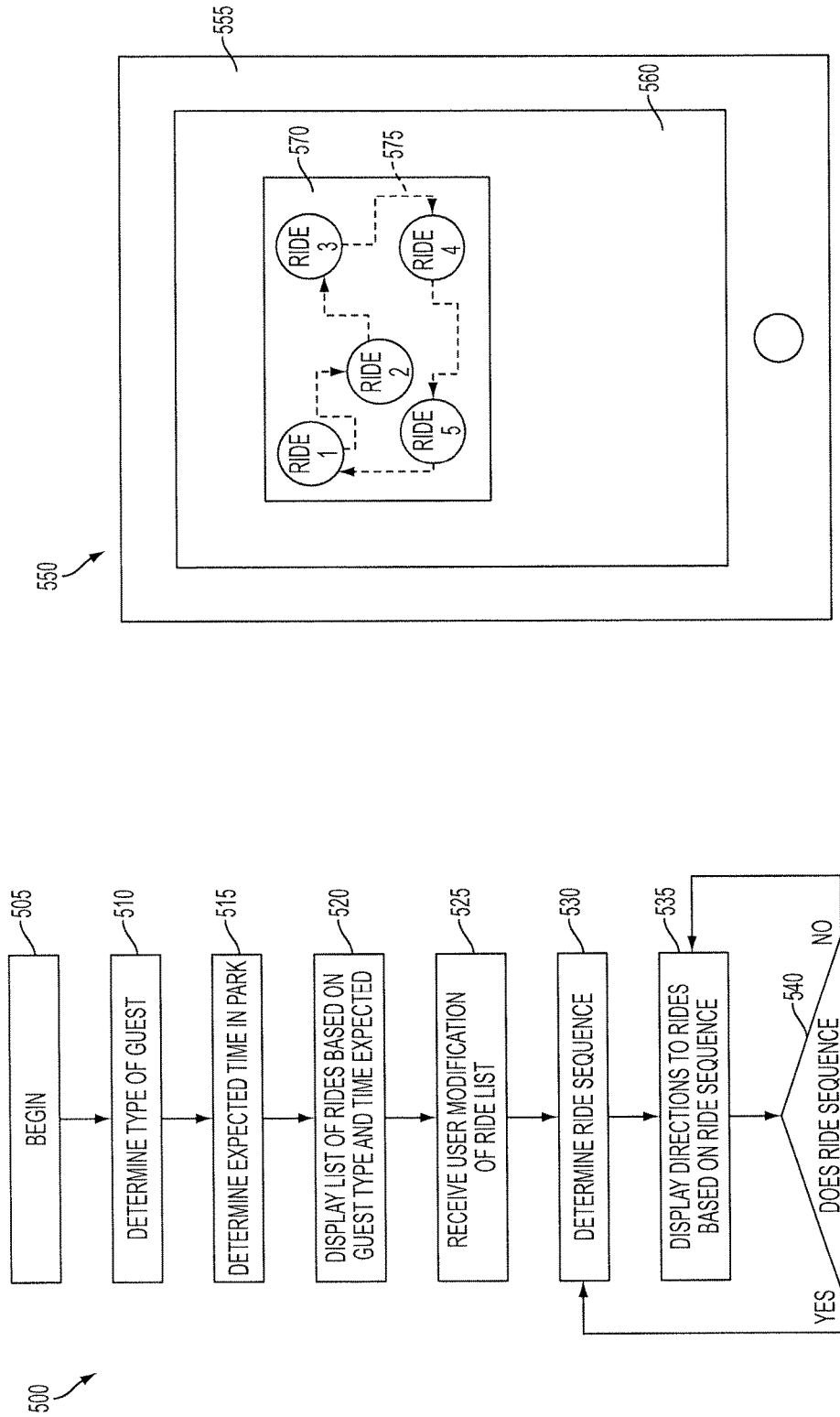

MOBILE APPLICATION FOR AN AMUSEMENT PARK OR WATERPARK

CROSS REFERENCE TO RELATED APPLICATIONS

This application claims the benefit of U.S. Provisional Patent Application Ser. No. 61/724,853, filed on Nov. 9, 2012, entitled "Mobile Application for an Amusement Park or Waterpark," which is hereby incorporated by reference in its entirety.

BACKGROUND

1. Field

The present invention relates generally to software applications. More particularly, the present invention relates to mobile software applications related to a waterpark or an amusement park and their attractions.

2. Description of the Related Art

Amusement parks and waterparks provide patrons with a wide range of possible entertainment activities or attractions, typically spread across a large plot of real estate due to the size and footprint required for the construction of the various rides or venues. Many families or visitors are required to expend time and effort prior to arriving at the park in identifying the types of rides, restaurants, or other attractions they wish to visit, particularly at larger parks where it is not possible to attend every attraction that is available within one day's time. In many cases, patrons must select the rides they most wish to attend during their visit, since even identification of all the attractions of interest may not suitably limit the attractions that time at the park permits. This can be an even greater issue during peak periods such as holidays and other common vacation timeframes since the population of visitors at the park rises substantially.

As smart phones, tablets, and other portable electronic devices become more common among adults and children, software applications for execution upon such devices (i.e., mobile applications) have become an increasingly popular pastime for users. Mobile applications have been developed as both games, productivity tools, and for a variety of educational capacities. Certain software applications have also been developed by companies to help inform or advertise to consumers about the products or services that are offered or available for consumption. For amusement parks, mobile applications have been developed that provide users with a listing of the attractions available, photographs of the attractions, and have included brief descriptions of these attractions for helping a user get acquainted with features of the park. Unfortunately, while these mobile applications provide users with some minimal educational value, such as overhead map views of the park, they generally do not provide any added convenience, help, or entertainment to a user when they are already present at the park. Indeed, once visiting the park, these mobile applications do not serve much, if any, additional purpose to the user.

Thus, a mobile application for amusement parks or waterparks that allows increased convenience to a user in selecting among rides, vendors, restaurants, attractions, or the like, particularly when already within the park, would be desirable. The mobile application would ideally be capable of identifying rides or other attractions of particular interest to a user, direct or navigate the user accordingly, and provide additional information to the user about the park that is more accurately keyed to the particular user while in the park. The mobile application would also ideally be capable of improving the user experience of a visitor in the park with time-saving or other entertainment features that allow the user to better allocate their time when within the park borders. Moreover, the mobile application would ideally be capable of tracking various user statistics, either for display to the user or for transmittal to a system of the amusement park or waterpark.

SUMMARY

A mobile application for providing information to a user about an amusement park or water park is disclosed. The disclosed mobile application may also be used for a wide variety of entertainment or convenience aspects based upon user participation or interaction with the mobile application, such as provision of discounts on park items, provision of vouchers or permission to move forward in a queue or line for a ride, dynamic alteration of one or more features of a water or amusement ride based upon satisfaction of certain objectives of an entertainment activity of the mobile application, etc.

In one embodiment, a method of providing information to a user about an amusement park via a mobile application configured to be executed by an electronic device may include the steps of determining a first attraction for participation thereon by the user, determining a position of the electronic device, searching for the first attraction within a predetermined area from the position of the electronic device, determining a wait time for the first attraction if the attraction is within the predetermined area, and navigating the user to the first attraction if the wait time for the first attraction is less than a first wait time.

In another embodiment, a method of providing information to a user regarding an amusement park, the method comprising the steps of providing a mobile application configured to be executed by a processor of a mobile device, determining, using the processor, a first attraction for participation thereon by the user, determining, using the processor, a geographic position of the mobile device, determining, using the processor, a distance of the first attraction from the geographic position of the mobile device, determining, using the processor, a first parameter corresponding to the first attraction if the distance of the first attraction from the geographic position of the mobile device is less than a first threshold, and navigating, using the processor, the user to the first attraction.

In another embodiment, a method of providing information to a user regarding an amusement park via a mobile application configured to be run by an electronic device may include the steps of determining a first characteristic representing the user, determining a second characteristic representing participation in the amusement park by the user, generating a list of attractions based upon the first characteristic and the second characteristic, generating a modified list of attractions from the list of attractions based upon input received by the user, generating an attraction sequence for the modified list of attractions, and navigating the user around the amusement park based upon the attraction sequence for the modified list of attractions.

In yet another embodiment, a method of providing information to a user about an amusement park, the method comprising the steps of providing a mobile application configured to be executed by a processor of a mobile device, determining, using the processor, a first characteristic corresponding to the user, determining, using the processor, a plurality of attractions for the user to participate thereon based upon the first characteristic, determining, using the processor, a response option corresponding to participation on the plurality of attractions, and navigating, using the processor, the user to the plurality of attractions based upon the response option.

In still another embodiment, a method of providing information to a user regarding an amusement park via a mobile application configured to be executed by an electronic device may include the steps of determining a position of the electronic device, determining if a vendor is located within a predetermined area of the position of the electronic device, and providing a first notification to the user of a discount available at the vendor if the vendor is within the predetermined area of the position of the electronic device.

In yet another embodiment, a method of dynamically adjusting a feature of an amusement ride based on a software application may include the steps of providing a software application for execution upon an electronic device, displaying an entertainment activity of the software application for interaction by a user of the electronic device, determining if the user has satisfied an objective of the entertainment activity of the software application based on the interaction by the user of the electronic device, and modifying a feature of the amusement ride if the user has satisfied the objective of the entertainment activity.

In still another embodiment, a method of adjusting a waterslide attraction may include the steps of providing a software application for execution by a processor of an electronic device, receiving input from the user via the electronic device, and modifying a feature of the waterslide attraction while a rider slides on the waterslide attraction based upon the input received from the user. The feature may include a volume of water (e.g., from water jets that spray or otherwise flow on the waterslide to slow down or speed up the rider), a plate (e.g., made of metal that acts in conjunction with electric and/or magnetic fields to exhibit a force upon the rider to slow down or speed up the rider), a queue or line (e.g., that a potential rider waits in before traveling upon a sliding surface of the waterslide attraction that may be dynamically adjusted for the potential rider by moving the rider forward or backward within the queue), etc.

In another embodiment, a mobile application for a waterslide attraction may include computer-readable instructions configured to be executed by a processor of a mobile device, the instructions configured to determine, using the processor, a first attraction for participation thereon by a user, determine, using the processor, a geographic position of the mobile device, determine, using the processor, a distance of the first attraction from the geographic position of the mobile device, determine, using the processor, a first parameter corresponding to the first attraction if the distance of the first attraction from the geographic position of the mobile device is less than a first threshold, and navigate, using the processor, the user to the first attraction.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale and may be exaggerated to better illustrate the important features of the present invention. In the drawings, like reference numerals designate like parts throughout the different views, wherein:

FIG. 5A shows a flowchart of operation of a mobile application corresponding to an amusement park or waterpark for determining a sequence of rides for a user based upon user characteristics according to an embodiment of the present invention; and FIG. 5B shows a display screen of a mobile application corresponding to an amusement park or waterpark for directing a user to a sequence of rides based upon user characteristics according to an embodiment of the present invention.

DETAILED DESCRIPTION

The detailed description of exemplary embodiments herein makes reference to the accompanying drawings and pictures, which show the exemplary embodiments by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1:
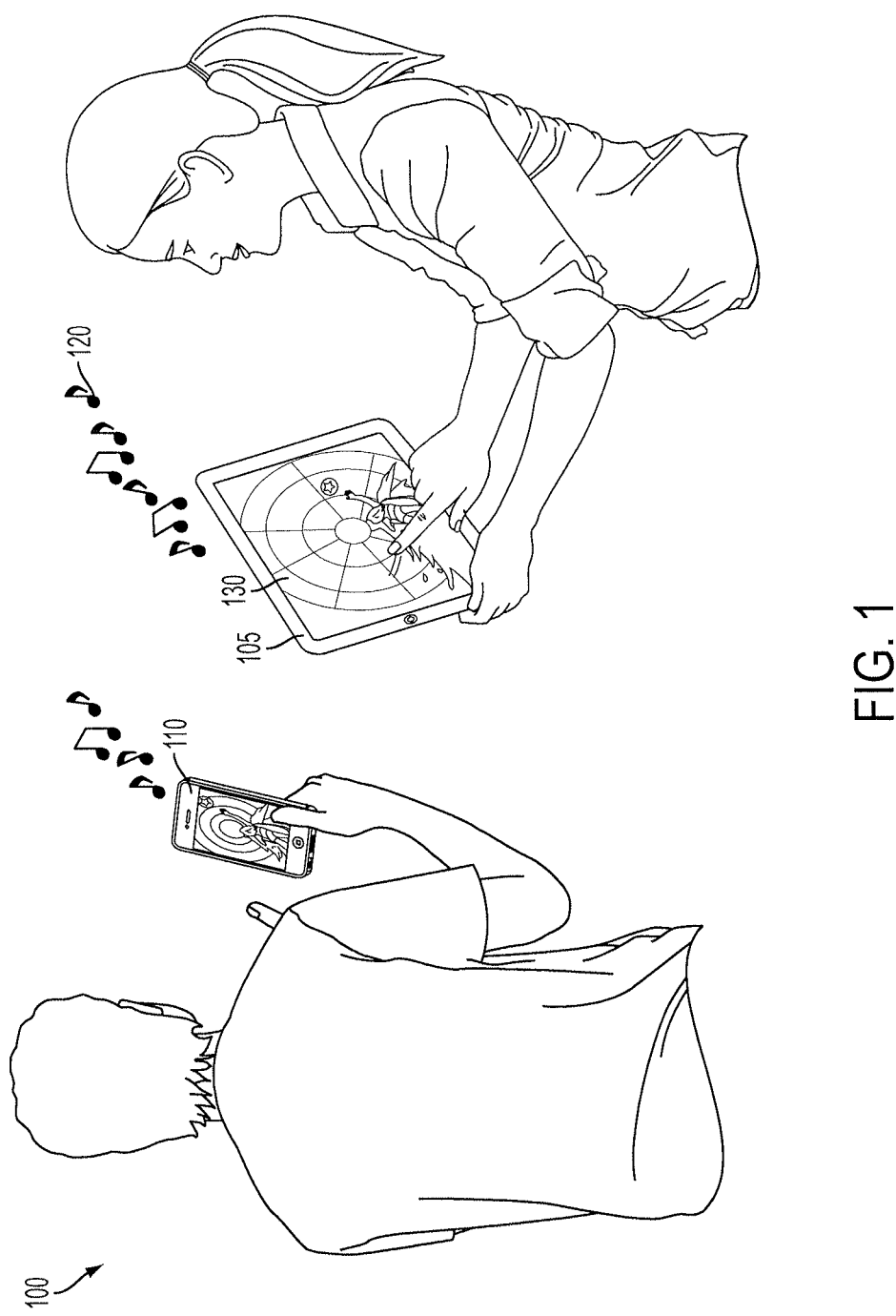
FIG. 1 shows a mobile application corresponding to an amusement park or waterpark in use by a plurality of users according to an embodiment of the present invention.

Turning first to FIG. 1, a mobile application 100 corresponding to an amusement park or waterpark may be installed upon electronic devices, as shown. The mobile application 100 may be configured to be executed on any of a variety of electronic devices, for example, a tablet 105 and/or a smartphone 110. The mobile application 100 may be configured to utilize varying display configurations (i.e., resolution, screen dimensions, fonts, graphics, etc.) based upon the type of electronic device being used. For example, when the mobile application 100 is downloaded and/or used on the tablet 105, additional, larger, or more detailed graphical elements, increased display resolution, and/or larger screen dimensions may be used for displaying the mobile application 100 due to the larger screen size of the tablet 105 when compared against other devices, such as the smartphone 110.

The mobile application 100 is configured to provide various information to a user regarding features or aspects of the amusement park or waterpark, as discussed in greater detail herein. The mobile application 100 may utilize both graphical information 130 and/or audible information 120 to interact with the user. In certain embodiments, the mobile application 100 may additionally or alternatively utilize tactile information (e.g., vibration of the electronic device). The mobile application 100 may interface with a database, stored locally and/or on a remote server, that is configured to store one or more user accounts or profiles. If the database is stored remotely, a user may have access to the account or profile stored in the database and can apply various configurations or settings for the mobile application 100 regardless of the electronic device used in executing the mobile application 100. In a preferred embodiment, the mobile application 100 will be configured to operate in a low power mode when a screen or display of the electronic device is turned off in order to save battery power of the electronic device. Since the user may not be in a position to recharge a battery of the electronic device while using the electronic device at the amusement park or waterpark, efficient management of battery power by the mobile application would be maintained by the low power mode and/or by other battery saving features (e.g., disabling certain graphical effects when the battery level goes below a predetermined threshold).

One of the typical complaints regarding amusement parks or waterparks is the boredom incurred by visitors while waiting in line to ride or participate on an attraction. Particularly for signature rides that entice large amounts of people to the park, it is not uncommon for a visitor to be required to wait upwards of 30-60 minutes in line before participating on the attraction. Having access to a smart phone, tablet, or other electronic device can help ease this boredom while waiting. The mobile application 100 for execution on the electronic device may include entertainment features or activities, such as games or puzzles, for interaction with the user. Moreover, the mobile application 100 may allow for these entertainment features to interact with the attraction itself or the line for the attraction.

For example, the line for the attraction may be dynamic such that users who actively engage in solving puzzles or scoring particularly well in a game of the mobile application 100 are permitted to move ahead in line in front of other individuals (e.g. to the front spot in line or to a separate, expedited line). Separate lines may be established for users who wish to participate in dynamic lines based upon solving puzzles or playing games as part of the mobile application 100 and more traditional lines that do not rely on mobile application 100 participation. In another example, users may engage in games, puzzles, scavenger hunts, or other activities of the mobile application 100 before arriving in a line to win or obtain line bypass awards or vouchers that may be used for various attractions in the park. Any of a variety of benefits or rewards can be provided to users based upon their participation in such games or puzzles, such as discounts at park vendors.

Certain features of the mobile application 100 may be used to affect the attraction itself. For example, a waterslide may include a plurality of dueling slides including various speed-boosting or speed-reducing features (e.g., water jets, magnetic plates, etc.) Users waiting in line to ride the waterslide may interface with the mobile application 100 to enable or disable certain of the speed-boosting or speed-reducing features of the waterslide. In one embodiment, a plurality of lines may be established for a waterslide, each line leading to a separate one of the plurality of dueling slides. Users in line for a first of the dueling slides may participate with a game or puzzle of the mobile application 100 to enable one or more speed-boosting features for the first of the dueling slides, disable one or more speed-reducing features for the first of the dueling slides, or to both enable one or more speed-boosting features for the first of the dueling slides and disable one or more speed-reducing features for the first of the dueling slides, thus helping the participant on the first of the dueling slides travel down in a faster amount of time.

Users in line for the first of the dueling slides may also participate with a game or puzzle of the mobile application 100 to disable one or more speed-boosting features or enable one or more speed-reducing features for the other dueling slides, thereby slowing down the other participants. In this manner, not only is a competition established between the participants of the waterslide engaged in the dueling slides, but a fun and competitive atmosphere is also created for individuals waiting in line.

Rewards may be provided to users who engage in various activities of the mobile application 100. For example, interactive and/or educational content may be provided for a user while at the amusement park or before arrival. Based upon the user's level of mastery of the content (e.g., obtaining a particular score in a game, solving a particular puzzle, learning the most educational information, etc.) rewards may be provided to the user, for example, via a printable or displayable coupon. These rewards may take any of a variety of forms, such as line bypass vouchers, price discount vouchers, passes to access certain areas of the park or tables at a restaurant, etc. If the mobile application 100 is connected with a user profile, either stored locally on the electronic device or on a remote server, the rewards may be listed and/or associated with the user profile. In this manner, users may be permitted to trade or share rewards with other users in order to obtain the various coupons, vouchers, or other rewards that are most desirable to them.

In certain embodiments, the mobile application 100 may provide information, updates, discounts, notifications of special events, etc. to a user even when the user is not currently at the amusement or water park (e.g., when at home or in the car traveling to the amusement or water park). For example, the mobile application 100 may be configured to provide data to the user via push messages, banner notifications, or the like on the electronic device. This data can take the form of general information about park events available to all patrons, or may be customized to specific users based upon their past visitation schedules, types of desired rides, or any other type of characteristic. In another example, such data may be provided to users after their successful completion of an entertainment or education feature of the mobile application 100 even if not currently within the park.

The mobile application 100 may also be configured to allow users to post pictures or photographs taken and processed through the mobile application 100 (e.g., by adding post processing filters, graphics, icons, text, etc.) to a location of the user's choice. Possible locations may be to a social media account (e.g., Facebook, Twitter, Google+) local storage or memory of the electronic device, or cloud-based storage, either via a separate application (e.g., Dropbox, iCloud, etc.) or as part of a storage account associated with a user profile of the mobile application 100. The photographs may also or additionally be provided to an email address for sharing among friends.

Figure 2:
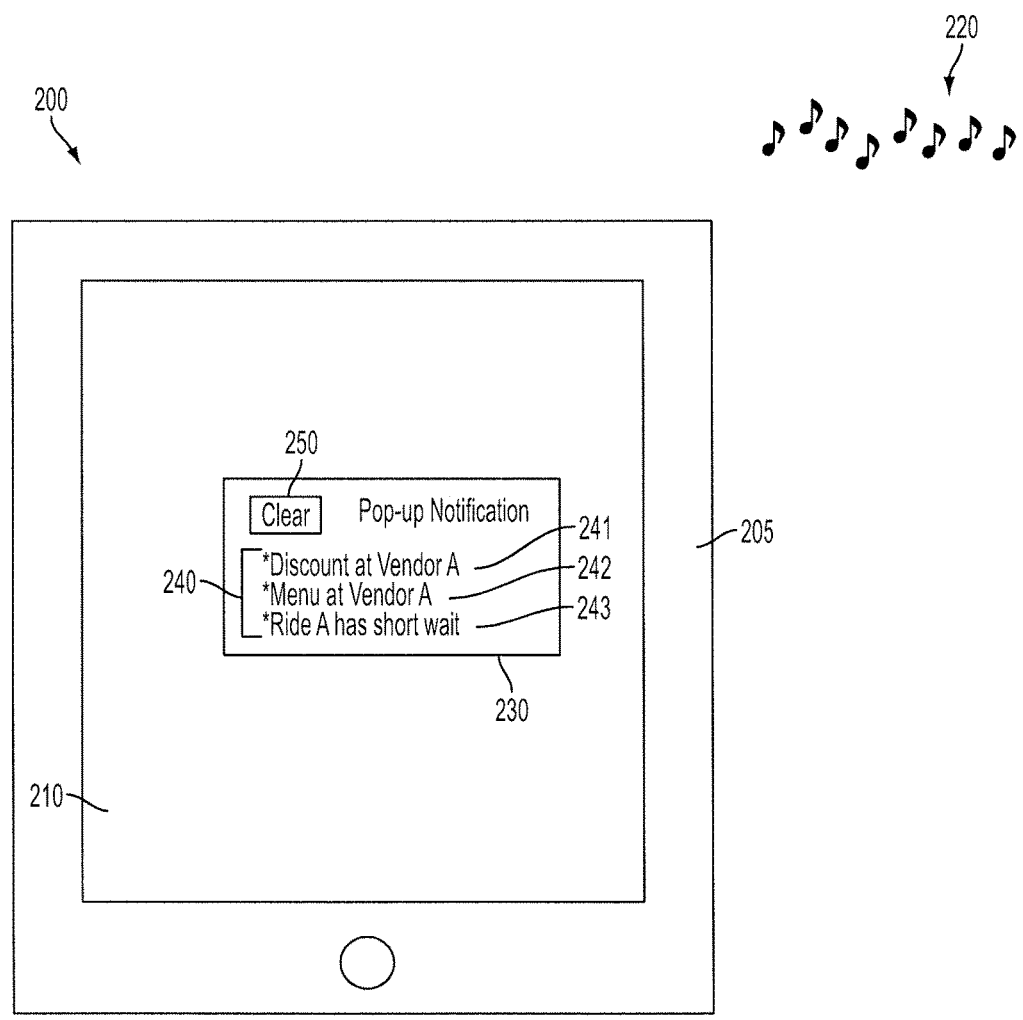
FIG. 2 shows a display screen of a mobile application corresponding to an amusement park or waterpark for displaying one or more notifications to a user according to an embodiment of the present invention.

Various other types of information may be provided or displayed to users of a mobile application in addition or in alternative to the entertainment aspects described above. Turning to FIG. 2, a display screen 200 of a mobile application corresponding to an amusement park or waterpark is shown for displaying one or more notifications to a user. The mobile application may include the same or similar features as previously described. The mobile application may be executed by an electronic device 205 having a display 210. Visual or graphical aspects of the mobile application may be displayed to a user via the display 210. Audible aspects 220 of the mobile application may be generated to the user via a speaker or other sound-emitting component or components of the electronic device 205. Certain embodiments may additionally or alternatively utilize tactile aspects (e.g., vibration of the electronic device).

The mobile application is configured to notify or identify to the user one or more pieces of information based upon a determined location of the mobile application. For example, if the mobile application is being executed upon an electronic device capable of determining geographic positioning, such as through the use of a global positioning system ("GPS"), particular pieces of information may be displayed that are relevant to such geographic positioning. Other manners of determining positioning of the electronic device may be utilized in an alternative embodiment. For example, if the electronic device has a camera or other image capture components, the user may be required to take a photograph of their position or point one or more of the image capture components at a particular location (e.g., at a vendor or attraction of the park, at a barcode upon the ground or upon a nearby sign for scanning, etc.)

In one embodiment and as shown, a popup notification box 230 may appear on the display 210 and include various information 240 therein. The popup notification box 230 may include a first statement 241 indicating that there are discounts available at Vendor A. Vendor A may be any of a variety of vendors, stores, restaurants, or the like that are within a predetermined vicinity of the geographic positioning of the electronic device executing the mobile application.

In one embodiment, the first statement 241 may include additional details or a listing of the various discounts available. In another embodiment, the first statement 241 may be a clickable link or other interactive graphic such that the user of the mobile application may interface with the first statement 241 (e.g., by pressing the display screen 210 at the location of display of the first statement 241) to be presented with another screen or another popup box that includes additional details about the one or more discounts available. In this manner, the popup notification box 230 may provide the user with cursory information about available discounts at one or more nearby vendors and allow the user to indicate which vendors or discounts are of the most interest.

The popup notification box 230 may also include a second statement 242 indicating a menu is available for user review for Vendor B. Like Vendor A, Vendor B may be any of a variety of vendors, stores, restaurants, or the like that are within a predetermined vicinity of the geographic positioning of the electronic device executing the mobile application. The predetermined vicinity used for determining whether to display the second statement 242 may be broader in geographic area than the predetermined vicinity used for determining whether to display the first statement 241. This is because patrons of the park may be more interested in the menus of restaurants that are further away when in search for food than the patrons would be in identifying discounts that are available within their proximity. In an alternative embodiment, the predetermined proximity relating to the second statement 242 may be the same as or smaller than the predetermined vicinity used for the first statement 241. Similarly, like the first statement 241, the second statement 242 may provide additional details about the menu within the notification box 230 or a user may interface with the second statement 242 to obtain such additional details on a further screen or popup box. Any of a variety of other options may be made available to the user via notifications. For example, the user may be notified of nearby restaurants and be presented with options to order food remotely, shorten their wait time in a line at the restaurant, obtain preferred seating at the restaurant, etc.

The popup notification box 230 may additionally include a third statement 243 indicating that Ride A has a wait time less than a predetermined amount of time. Like discussed above for Vendor A and/or Vendor B, Ride A may be any of a variety of rides or features of the amusement park or waterpark within a predetermined vicinity of the geographic positioning of the electronic device executing the mobile application that patrons must queue in line for in order to so ride or attend. In certain embodiments, the user may select or identify particular types of notifications that are desired (e.g., only food-related notifications, etc.) and the mobile application will limit such notifications to only those selected. The user may also or additionally set the predetermined vicinity (either upon loading the mobile application or within a user account or profile accessed by the mobile application) for the provision of such notifications. A graphical button or other element 250 may be included within the popup notification box 230 or displayed elsewhere on the display screen 210 for removing one or more of the notifications displayed in the popup notification box 230.

Figure 3:
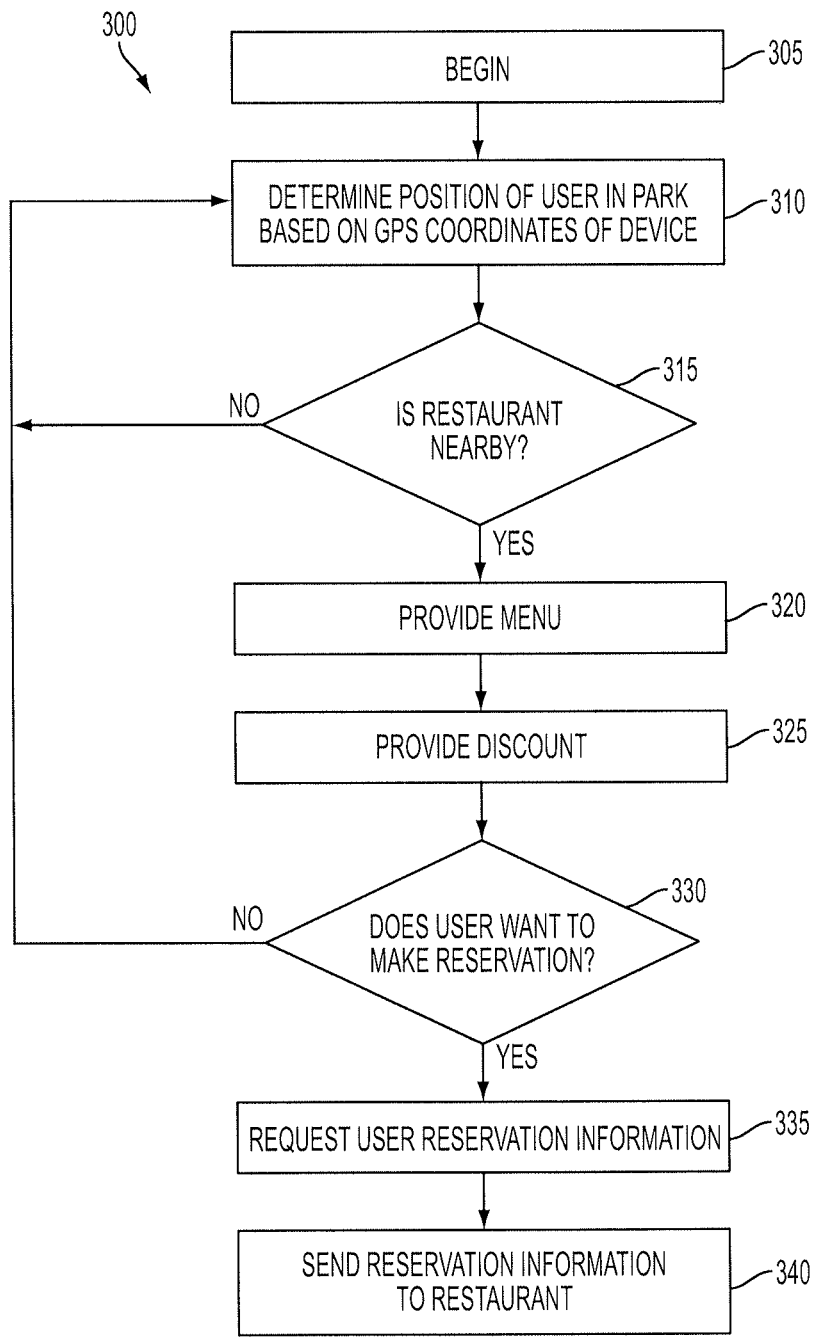
FIG. 3 shows a flowchart of operation of a mobile application corresponding to an amusement park or waterpark for displaying notifications to a user based upon geographic location according to an embodiment of the present invention.

FIG. 3 shows a flowchart of operation of a mobile application 300 corresponding to an amusement park or waterpark for displaying notifications to a user based upon geographic location. The mobile application 300 may include the same or similar features as previously described. At step 305, operation begins. This may occur, for example, upon a user executing the mobile application 300 upon an electronic device. In another embodiment, operation may begin when a user has already loaded the mobile application 300, but subsequently places the mobile application 300 into a particular mode of operation (e.g., notification mode), such as by selecting a menu option or other setting within the mobile application 300. In still another embodiment, operation may begin when a user has already loaded the mobile application 300, but brings the mobile application 300 into focus or to the front of the display screen of the electronic device.

At step 310, the mobile application 300 determines a position of the electronic device being used by the user. This may be performed by determining geographic coordinates for the user based off of GPS elements contained within or interfacing with the electronic device. If the electronic device is a cellular-enabled smartphone or tablet, such geographic coordinates may be determined by interfacing with one or more satellites to determine a precise position of the electronic device. Such a determination may be performed continuously or by including time delays as desired (e.g., a new position determination may occur every 5 minutes). The lower the time delay in determining a position, the more accurate the actual position of the electronic device may be, but at the expense of battery life for the electronic device.

In another embodiment, the user may be required to actively participate in the determination of the positioning. This may be accomplished, for example, by taking a photograph of a surrounding area or nearby landmark with a camera included within or interfacing with the electronic device. Images taken with the camera may be matched by the mobile application 300 with stored images of known locations within the park to determine the positioning of the electronic device. In another example, the user may be required to scan a barcode or other identifying symbol by using the electronic device that may then be read or interpreted by the electronic device and/or the mobile application 300 and compared to stored barcodes or symbols corresponding to known locations within the park.

At step 315, one or more restaurants or other dining facilities or vendors within a predetermined vicinity of the position of the electronic device determined in step 310 are determined. This may be accomplished by identifying among a list of stored restaurants, dining facilities, or vendors stored as part of the mobile application 300 in a memory of the electronic device, those locations present within a particular geographic radius of the position of the electronic device. The geographic radius may be a default value provided by the mobile application 300. In certain embodiments, the geographic radius may be set or modified by the user in a setting or option of the mobile application 300. If there are no restaurants or other dining facilities or vendors located within the predetermined vicinity of the electronic device, operation continues back to step 310 for a new determination of positioning.

If there are at least one or more restaurants, dining facilities, or vendors located within the predetermined vicinity, the closest geographical one may be automatically selected by the mobile application for further operation. Alternatively, if there are multiple restaurants, dining facilities, or vendors located within the predetermined vicinity, a list of them may be displayed to the user for the user to select for further operation. Upon selection, operation continues to step 320. At step 320, a menu for the selected restaurant is provided or displayed to the user on the electronic device. At step 325, any available discounts for the selected restaurant are provided or displayed to the user on the electronic device.

At step 330, the mobile application 300 requests whether the user wishes to make a reservation at the restaurant. A list of available reservation times may be displayed to the user for aiding the user in responding. If the user indicates that no reservation at the restaurant is required, operation continues back to step 310. However, if the user does wish to make a reservation, operation continues to step 335 where user reservation information is requested and received by the mobile application 300. For example, this information may include a name for the party, the number of people in the party, a desired time for the reservation, etc. The user may enter this information via the electronic device in response to the request. At step 340, the reservation information received by the mobile application 300 is sent (e.g., wirelessly) to the corresponding restaurant or other remote system or device. Upon such transmittal, a notification or confirmation message may be displayed to the user indicating that the reservation has been completed and/or with a summary of the completed reservation. In an alternative embodiment, any of a variety of other features or options may be made available to the user. For example, the user may select items from a menu and choose a pickup time in order to bypass the line at the restaurant for pickup of their selected food items.

Figure 4:
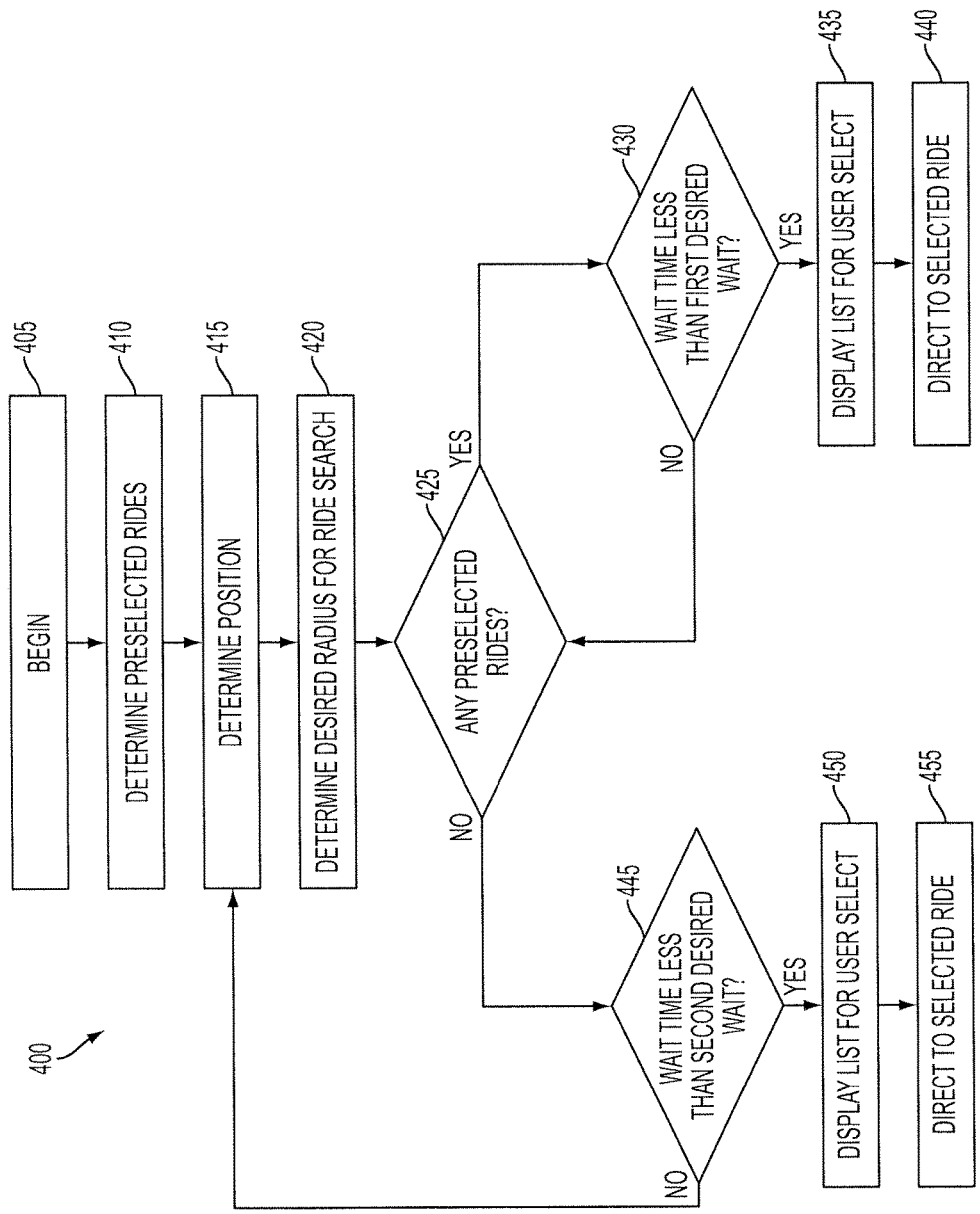
FIG. 4 shows a flowchart of operation of a mobile application corresponding to an amusement park or waterpark for directing a user to a ride based upon geographic location and wait time according to an embodiment of the present invention.

Turning next to FIG. 4, a flowchart of operation of a mobile application 400 for execution on an electronic device and corresponding to an amusement park or waterpark is shown for directing a user to a ride based upon geographic location and wait time. The mobile application 400 may include the same or similar features as previously described. At step 405, operation begins. This may occur, for example, upon a user executing the mobile application 400 upon an electronic device. In another embodiment, operation may begin when a user has already loaded the mobile application 400, but subsequently places the mobile application 400 into a particular mode of operation (e.g., a ride navigation mode), such as by selecting a menu option or other setting within the mobile application 400. In still another embodiment, operation may begin when a user has already loaded the mobile application 400, but brings the mobile application 400 into focus or to the front of the display screen of the electronic device.

At step 410, the mobile application 400 determines or sets one or more preselected rides for the user. In one embodiment, this may occur via user interaction (e.g., the user may choose among a list of rides or attractions that are most desirable). In another embodiment, the mobile application 400 may automatically identify the one or more preselected rides for the user. For example, the mobile application 400 may interface with a user profile corresponding to the user that is stored in a memory of the electronic device or stored remotely and accessed by the mobile application 400. The user profile may contain information identifying the types of rides most enjoyed by the user, characteristics of the user (height, age, weight, etc.), previously stored rides or attractions participated on by the user, previously stored rides indicated by the user as desirable, etc. Using the information in the user profile, the mobile application 400 may automatically choose a predetermined set of rides for the user. The selection may be based upon any of a variety of information in addition to or alternate from user profile information, such as time expected to be spent in the park, time of day visiting the park, expected weather during the visit to the park, whether the user is visiting the park during a particular time of year (e.g., holiday or peak period), etc.

At step 415, the mobile application 400 determines a position of the electronic device being used by the user. This may be performed by determining geographic coordinates for the user based off of GPS elements contained within or interfacing with the electronic device. If the electronic device is a cellular-enabled smartphone or tablet, such geographic coordinates may be determined by interfacing with one or more satellites to determine a precise position of the electronic device. Such a determination may be performed continuously or with any time delays as desired, for example, as previously discussed.

At step 420, the mobile application 400 determines and/or identifies rides or attractions within a desired radius surrounding or area in a proximity to the position of the electronic device determined in step 415. In one embodiment, the radius or proximity may be set or modified by the user. At step 425, the mobile application 400 determines whether any of the preselected rides or attractions as identified in step 410 are within the desired radius or proximity. If so, operation continues to step 430. At step 430, the mobile application 400 determines whether a wait or queue time for one or more attraction or ride is lower than a first wait time.

The first wait time may be a default time established by the mobile application 400 and/or may be a customizable time established by the user. In certain embodiments, the first wait time may be dynamic, such that it changes depending upon time of day, day of week, whether it is a holiday, the type of ride or attraction it corresponds to, etc. If the wait or queue time for one or more attraction or ride is not less than the first wait time, operation returns to step 425. However, if the wait or queue time for one or more attraction or ride is less than the first wait time, these corresponding attractions or rides are displayed to the user at step 435, for example with their associated queue or wait time. The user may then review the attractions or rides being displayed and select one or more of interest. Operation then continues to step 440 where the mobile application 400 directs or navigates the user from the position determined in step 415 to the attractions or rides selected in step 435.

If none of the preselected rides (see step 410) are within the desired radius or proximity (see step 425), operation instead continues to step 445. Similar to step 430, at step 445, the mobile application 400 determines whether a wait or queue time for one or more attraction or ride is lower than a second wait time. The second wait time may be a default time established by the mobile application 400 and/or may be a customizable time established by the user. In one example, the second wait time of step 445 may be less than the first wait time of step 430. This is because a user may be willing to wait for a longer period of time to queue for one of the desired preselected rides than for a ride that is not as desired. In certain embodiments, the second wait time may be dynamic, such that it changes depending upon time of day, day of week, whether it is a holiday, the type of ride or attraction it corresponds to, etc. In an alternative embodiment, the wait or queue time for one or more attraction or ride may be any of a variety of parameters corresponding to a ride (e.g., level of thrill of the ride, size of user, distance, age/height/weight requirements, etc.)

If the wait or queue time for one or more attraction or ride is not less than the second wait time, operation returns to step 415 and operation continues as previously discussed. However, if the wait or queue time for one or more attraction or ride is less than the second wait time, these corresponding attractions or rides are displayed to the user at step 450, for example with their associated queue or wait time. The user may then review the attractions or rides being displayed and select one or more of interest. Operation then continues to step 455 where the mobile application 400 directs or navigates the user from the position determined in step 415 to the attractions or rides selected in step 450.

FIG. 5A shows a flowchart of operation of a mobile application 500 corresponding to an amusement park or waterpark for determining a sequence of rides for a user based upon user characteristics. The mobile application 500 may include the same or similar features as previously described. At step 505, operation begins. This may occur, for example, upon a user executing the mobile application 500 upon an electronic device. In another embodiment, operation may begin when a user has already loaded the mobile application 500, but subsequently places the mobile application 500 into a particular mode of operation (e.g. an attraction selection mode), such as by selecting a menu option or other setting within the mobile application 500. In still another embodiment, operation may begin when a user has already loaded the mobile application 500, but brings the mobile application 500 into focus or to the front of the display screen of the electronic device.

At step 510, the mobile application 500 determines a type of guest representative of the user. This may be accomplished by querying the user to answer one or more questions, for example, the user's age, height, gender, favorite types of ride, etc. In another embodiment, a plurality of guest types may be defined and shown to the user for user self-identification and selection. In still another embodiment, a default type of user may be established by the mobile application 500. If the mobile application 500 stores or otherwise interfaces with a user profile, such information or guest type data may be automatically retrieved by the mobile application 500 upon association of the user profile with the user.

After determining the type of guest corresponding to the user, operation continues to step 515 where the mobile application 500 determines the amount of time expected or estimated that the user will be available to participate in the various attractions or rides within the park. Similar to the determination of guest type as discussed above, this may be accomplished by querying the user to answer one or more questions (e.g., expected time to enter the park, expected time to exit the park, how many meals are expected to be eaten at the park, etc.) In another embodiment, a plurality of time amounts may be defined and shown to the user for user self-identification and selection. In still another embodiment, a default amount of time for user activity in the park may be established by the mobile application. Similarly, such information may be stored and retrieved as part of a user profile, as discussed above.

At step 520, the mobile application 500 determines and displays a list of attractions or rides for the user based upon the determination of type of guest in step 510 and based upon determination of the amount of time expected that the user will be in the park in step 515. The mobile application 500 may store or have access to information about the park, including a listing of the available rides and their common wait or queue times that is used in conjunction with the guest information described above and in order to determine the list of attractions or rides. For example, if the user is determined to be a guest most interested in thrill rides and expects to spend 8 hours in the park participating on various attractions, the mobile application 500 may focus selection upon only exciting rides for older individuals such as roller coasters, high-speed water rides, and the like. Since these thrill rides may have longer wait times associated with them than other, tamer rides, fewer attractions or rides may be determined and displayed for the user than if the user was determined to be a type of guest that did not enjoy thrill rides.

At step 525, the user is allowed to modify the attraction or ride list determined by the mobile application 500 in step 520. Thus, the user is permitted to add or remove particular rides to better conform to the desired amount and type of rides when at the park. Operation next continues to step 530 where the mobile application 500 determines a response option (e.g., a ride sequence, a query to the user for a next ride to visit, etc.) for the modified ride list of step 525. For example, the mobile application 500 may have information stored in a memory of the electronic device or may interact with a remote server storing such information that relates to wait or queue times for the various rides of the modified ride list. The wait or queue time information may include separate wait times for each ride based upon time of day, day of week, holidays vs. standard calendar days, etc. Thus, if a particular ride commonly has a long queue time, but is typically less busy at a particular time of day (e.g., immediately upon park opening), that ride may be scheduled first for user participation in an effort to most efficiently manage time of the user while they are in the park. In another embodiment, the wait times for each ride may be instantaneously obtained via interfacing with a system that monitors and updates in real time with line queue data.

At step 535, the mobile application 500 navigates the user around the amusement park based upon the response option (e.g., the attraction sequence) for the modified list of attractions. For example, this may be done by displaying textual navigation instructions (e.g., "turn right here," "head west," "travel straight ahead for 50 meters," etc.). In another example, a map may be displayed to the user with a graphical indication showing a travel path for the user (e.g., a dotted line leading from the determined position of the electronic device to the subsequent attraction to be visited by the user). Certain embodiments may feature both a map and textual directions.

At step 540, the mobile application 500 determines whether the response option (e.g., attraction sequence) needs to be modified. This may be determined automatically without user intervention, for example by interfacing with a park system that transmits data about the attractions. For example, if a particular attraction breaks down or has a line queue time above a certain threshold, the attraction sequence may be modified to remove or otherwise delay the attraction in the list of rides to visit. In another example, a user may indicate that the attraction sequence needs to be modified by interfacing with the mobile application 500. If the attraction sequence does not need to be modified, operation continues at step 535 until each of the rides determined in the response options, such as the modified ride list, are visited by the user. If the attraction sequence does need to be modified, operation continues to step 530 for such modification, as previously discussed.

FIG. 5B shows a display screen of a mobile application 550 corresponding to an amusement park or waterpark for directing a user to a sequence of rides based upon user characteristics. The mobile application 550 may include the same or similar features as previously described. An electronic device 555 includes a display or other screen 560 configured to display graphical information of the mobile application 550. A map 570 is shown on the display screen and includes a travel path or indication 575 for navigating the user through the sequence of rides during their visit within the amusement park or waterpark, the same or similar as previously discussed for FIG. 5A.

The previously discussed mobile applications may include features and/or operation different from those stated in the exemplary embodiments detailed above. Features and/or operation in one embodiment may also or additionally be included with features and/or operation of a separately discussed embodiment. Moreover, features may be added, removed, or executed with different operative flow from the exemplary embodiments detailed above. For example, in certain embodiments, a mobile application may inform a user of the best times to go to a particular amusement park, for example, during off-peak hours. In this manner, the mobile application may be used to help amusement or water parks obtain more steady usage and provide customers with shorter wait times due to the spreading of patron population within the park over the operating hours of the park.

The previous description of the disclosed examples is provided to enable any person of ordinary skill in the art to make or use the disclosed methods and apparatus. Accordingly, the terminology employed throughout should be read in a non-limiting manner. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope. Skilled artisans may implement the described functionality in varying ways for each particular application, but such implementation decisions should not be interpreted as causing a departure from the scope of the disclosed apparatus and/or methods.

What is claimed is:

1. A method of providing information to a user regarding an amusement park, the method comprising the steps of:
providing a mobile application configured to be executed by a processor of a mobile device;
determining, using the processor, a first attraction for participation thereon by the user;
determining, using the processor, a geographic position of the mobile device;
determining, using the processor, a first parameter corresponding to the first attraction;
receiving, using the processor, a numerical value from the user;
comparing, using the processor, the numerical value with the first parameter;
navigating, using the processor, the user to the first attraction based on the comparing of the first parameter with the numerical value;
determining, using the processor, a second attraction for participation thereon by the user;
determining, using the processor, a wait time corresponding to the second attraction; and
navigating, using the processor, the user to the second attraction after the navigating of the user to the first attraction based on the wait time corresponding to the second attraction being less than the numerical value.

2. The method of claim 1 wherein the step of determining, using the processor, the geographic position of the mobile device comprises the use of a global positioning system (GPS) of the mobile device.

3. The method of claim 1 wherein the step of navigating the user to the first attraction or the second attraction comprises displaying a map on a screen of the mobile device.

4. The method of claim 1 wherein the first attraction or the second attraction is configured to be selected by the user from a list of attractions displayed on the mobile device.

5. The method of claim 1 further comprising the step of generating a user profile corresponding to the user, the user profile configured to be accessed by the mobile application.

6. The method of claim 1 wherein the first parameter is a wait time for the first attraction and wherein the numerical value received from the user is a threshold wait time.

7. The method of claim 1 wherein the step of navigating the user to the second attraction after the navigating of the user to the first attraction comprises displaying a map on a screen of the mobile device, the map indicating a travel route extending from the geographic position of the mobile device to the second attraction and through the first attraction.

8. The method of claim 1 wherein the first parameter is a thrill level for the first attraction and wherein the numerical value is a desired thrill level of the user.

9. The method of claim 1 wherein the first parameter is a thrill level and wherein the numerical value is a threshold thrill level.

10. The method of claim 1 wherein the first parameter is a user height requirement and wherein the numerical value is a height.

11. The method of claim 1 wherein the first parameter is a user weight requirement and wherein the numerical value is a weight.

12. The method of claim 1 wherein the first parameter is a user age requirement and wherein the numerical value is an age.

13. The method of claim 1 wherein the receiving of the numerical value from the user comprises receiving a number entered by the user.

14. The method of claim 1 wherein the receiving of the numerical value from the user comprises retrieving a number from a user profile associated with the user.

15. A method of providing information to a user regarding an amusement park, the method comprising the steps of:
providing a mobile application configured to be executed by a processor of a mobile device;
determining, using the processor, a first attraction for participation thereon by the user;
determining, using the processor, a geographic position of the mobile device;
determining, using the processor, a first parameter corresponding to the first attraction;
receiving, using the processor, a numerical value from the user;
comparing, using the processor, the numerical value with the first parameter;
navigating, using the processor, the user to the first attraction based on the comparing of the first parameter with the numerical value;
determining, using the processor, a second attraction for participation thereon by the user;
determining, using the processor, a second parameter corresponding to the second attraction;
receiving, using the processor, a second numerical value from the user; and
navigating, using the processor, the user to the second attraction after the navigating of the user to the first attraction based on the second parameter being less than the second numerical value.

16. The method of claim 15 wherein the step of determining, using the processor, the geographic position of the mobile device comprises the use of a global positioning system (GPS) of the mobile device.

17. The method of claim 15 wherein the step of navigating the user to the first or the second attraction comprises displaying a map on a screen of the mobile device.

18. The method of claim 15 wherein the first attraction or the second attraction is configured to be selected by the user from a list of attractions displayed on the mobile device.

19. The method of claim 15 further comprising the step of generating a user profile corresponding to the user, the user profile configured to be accessed by the mobile application.

20. The method of claim 15 wherein the first parameter is a wait time for the first attraction and the numerical value received from the user is a threshold wait time, and
wherein the second parameter is a wait time for the second attraction and the second numerical value received from the user is a threshold wait time.

21. The method of claim 15 wherein the first parameter is a thrill level for the first attraction or the second parameter is a thrill level for the second attraction.

22. The method of claim 15 wherein the first parameter is a user height requirement for the first attraction or the second parameter is a user height requirement for the second attraction.

23. The method of claim 15 wherein the first parameter is a user weight requirement for the first attraction or the second parameter is a user weight requirement for the second attraction.

24. The method of claim 15 wherein the first parameter is a user age requirement for the first attraction or the second parameter is a user age requirement for the second attraction.

25. The method of claim 15 wherein the receiving of the numerical value or the second numerical value from the user comprises receiving a number entered by the user.

26. The method of claim 15 wherein the receiving of the numerical value or the second numerical value from the user comprises retrieving a number from a user profile associated with the user.

27. The method of claim 15 wherein the navigating the user to the second attraction after navigating of the user to the first attraction comprises displaying a map on a screen of the mobile device, the map indicating a travel route extending from the geographic position of the mobile device to the second attraction and through the first attraction.

28. A method of providing information to a user regarding an entertainment venue, the method comprising the steps of:
providing a mobile application configured to be executed by a processor of a mobile device;
determining, using the processor, a first attraction for participation by the user;
determining, using the processor, a wait time corresponding to the first attraction;
determining, using the processor, a second attraction for participation by the user;
determining, using the processor, a wait time corresponding to the second attraction;
receiving, using the processor, a numerical value from the user;
comparing, using the processor, the numerical value with the wait time corresponding to the first attraction and the wait time corresponding to the second attraction; and
navigating, using the processor, the user to the first attraction and subsequently to the second attraction based on the comparing of the numerical value with the wait time corresponding to the first attraction and the wait time corresponding to the second attraction.

29. The method of claim 28 wherein the numerical value is a threshold wait time.

30. The method of claim 28 wherein the navigating of the user to the first attraction and subsequently to the second attraction occurs only when the numerical value is less than or equal to the wait time corresponding to the first attraction and the wait time corresponding to the second attraction.

31. The method of claim 28 wherein the receiving of the numerical value from the user comprises receiving a number entered by the user.

32. The method of claim 28 wherein the receiving of the numerical value from the user comprises retrieving a number from a user profile associated with the user.

33. The method of claim 28 wherein the navigating of the user to the first attraction and subsequently to the second attraction comprises displaying a map on a screen of the mobile device, the map indicating a travel route extending from a geographic position of the mobile device, to the first attraction, and then to the second attraction.

34. A method of providing information to a user regarding an entertainment venue, the method comprising the steps of:
  providing a mobile application configured to be executed by a processor of a mobile device;
  determining, using the processor, a first attraction for participation by the user;
  determining, using the processor, a thrill level corresponding to the first attraction;
  determining, using the processor, a second attraction for participation by the user;
  determining, using the processor, a thrill level corresponding to the second attraction;
  receiving, using the processor, a numerical value from the user;
  comparing, using the processor, the numerical value with the thrill level corresponding to the first attraction and the thrill level corresponding to the second attraction; and
  navigating, using the processor, the user to the first attraction and subsequently to the second attraction based on the comparing of the numerical value with the thrill level corresponding to the first attraction and the thrill level corresponding to the second attraction.

35. The method of claim 34 wherein the numerical value is a threshold thrill level.

36. The method of claim 34 wherein the receiving of the numerical value from the user comprises receiving a number entered by the user.

37. The method of claim 34 wherein the receiving of the numerical value from the user comprises retrieving a number from a user profile associated with the user.

38. The method of claim 34 wherein the navigating of the user to the first attraction and subsequently to the second attraction comprises displaying a map on a screen of the mobile device, the map indicating a travel route extending from a geographic position of the mobile device, to the first attraction, and then to the second attraction.

39. The method of claim 34 wherein the navigating of the user to the first attraction and subsequently to the second attraction occurs only when the numerical value is less than or equal to the thrill level corresponding to the first attraction and the thrill level corresponding to the second attraction.

40. The method of claim 34 wherein the navigating of the user to the first attraction and subsequently to the second attraction occurs only when the numerical value is greater than or equal to the thrill level corresponding to the first attraction and the thrill level corresponding to the second attraction.

41. The method of claim 34 wherein the navigating of the user to the first attraction and subsequently to the second attraction occurs only when the numerical value is equal to the thrill level corresponding to the first attraction and the thrill level corresponding to the second attraction.

42. A method of providing information to a user regarding an entertainment venue, the method comprising the steps of:
  providing a mobile application configured to be executed by a processor of a mobile device;
  determining, using the processor, a first attraction for participation by the user;
  determining, using the processor, a physical user characteristic requirement corresponding to the first attraction;
  determining, using the processor, a second attraction for participation by the user;
  determining, using the processor, a physical user characteristic requirement corresponding to the second attraction;
  receiving, using the processor, a numerical value from the user;
  comparing, using the processor, the numerical value with the physical user characteristic requirement corresponding to the first attraction and the physical user characteristic requirement corresponding to the second attraction; and
  navigating, using the processor, the user to the first attraction and subsequently to the second attraction based on the comparing of the numerical value with the physical user characteristic requirement corresponding to the first attraction and the physical user characteristic requirement corresponding to the second attraction.

43. The method of claim 42 wherein the numerical value is a threshold physical user characteristic requirement.

44. The method of claim 42 wherein the receiving of the numerical value from the user comprises receiving a number entered by the user.

45. The method of claim 42 wherein the receiving of the numerical value from the user comprises retrieving a number from a user profile associated with the user.

46. The method of claim 42 wherein the navigating of the user to the first attraction and subsequently to the second attraction comprises displaying a map on a screen of the mobile device, the map indicating a travel route extending from a geographic position of the mobile device, to the first attraction, and then to the second attraction.

47. The method of claim 42 wherein the navigating of the user to the first attraction and subsequently to the second attraction occurs only when the numerical value is less than or equal to the physical user characteristic requirement corresponding to the first attraction and the physical user characteristic requirement corresponding to the second attraction.

48. The method of claim 42 wherein the navigating of the user to the first attraction and subsequently to the second attraction occurs only when the numerical value is greater than or equal to the physical user characteristic requirement corresponding to the first attraction and the physical user characteristic requirement corresponding to the second attraction.

49. The method of claim 42 wherein the navigating of the user to the first attraction and subsequently to the second attraction occurs only when the numerical value is equal to the physical user characteristic requirement corresponding to the first attraction and the physical user characteristic requirement corresponding to the second attraction.

50. The method of claim 42 wherein the physical user characteristic requirement for the first attraction or the physical user characteristic requirement for the second attraction is a user height requirement.

51. The method of claim 42 wherein the physical user characteristic requirement for the first attraction or the physical user characteristic requirement for the second attraction is a user weight requirement.

52. The method of claim 42 wherein the physical user characteristic requirement for the first attraction or the physical user characteristic requirement for the second attraction is a user age requirement.

53. A method of providing information to a user comprising the steps of:
  providing a mobile application configured to be executed by a processor of a mobile device;
  determining, using the processor, a first attraction for the user;
  determining, using the processor, a user characteristic requirement corresponding to the first attraction;

determining, using the processor, a second attraction for the user;

determining, using the processor, a user characteristic requirement corresponding to the second attraction;

receiving, using the processor, a numerical value from the user;

comparing, using the processor, the numerical value with the user characteristic requirement corresponding to the first attraction and the user characteristic requirement corresponding to the second attraction; and navigating, using the processor, the user to the first attraction and subsequently to the second attraction based on the comparing of the numerical value with the user characteristic requirement corresponding to the first attraction and the user characteristic requirement corresponding to the second attraction, wherein the user characteristic requirement corresponding to the first attraction or the user characteristic requirement corresponding to the second attraction is at least one of a user height requirement, a user weight requirement, or a user age requirement.

54. The method of claim 53 wherein the numerical value is a threshold user characteristic requirement.

55. The method of claim 53 wherein the receiving of the numerical value from the user comprises receiving a number entered by the user.

56. The method of claim 53 wherein the receiving of the numerical value from the user comprises retrieving a number from a user profile associated with the user.

57. The method of claim 53 wherein the navigating of the user to the first attraction and subsequently to the second attraction comprises displaying a map on a screen of the mobile device, the map indicating a travel route extending from a geographic position of the mobile device, to the first attraction, and then to the second attraction.

58. The method of claim 53 wherein the navigating of the user to the first attraction and subsequently to the second attraction occurs only when the numerical value is less than or equal to the user characteristic requirement corresponding to the first attraction and the user characteristic requirement corresponding to the second attraction.

59. The method of claim 53 wherein the navigating of the user to the first attraction and subsequently to the second attraction occurs only when the numerical value is greater than or equal to the user characteristic requirement corresponding to the first attraction and the user characteristic requirement corresponding to the second attraction.

60. The method of claim 53 wherein the navigating of the user to the first attraction and subsequently to the second attraction occurs only when the numerical value is equal to the user characteristic requirement corresponding to the first attraction and the user characteristic requirement corresponding to the second attraction.

* * * * *